United States Patent
Ishinagawa

(10) Patent No.: US 8,451,399 B2
(45) Date of Patent: May 28, 2013

(54) LIQUID CRYSTAL DISPLAY DEVICE

(75) Inventor: Shinichi Ishinagawa, Ichihara (JP)

(73) Assignees: Hitachi Displays, Ltd., Chiba (JP); Panasonic Liquid Crystal Display Co., Ltd., Hyogo-Ken (JP)

( * ) Notice: Subject to any disclaimer, the term of this patent is extended or adjusted under 35 U.S.C. 154(b) by 138 days.

(21) Appl. No.: 13/071,597

(22) Filed: Mar. 25, 2011

(65) Prior Publication Data
US 2011/0234940 A1    Sep. 29, 2011

(30) Foreign Application Priority Data
Mar. 26, 2010  (JP) .................. 2010-072712

(51) Int. Cl.
*G02F 1/1335*  (2006.01)

(52) U.S. Cl.
USPC .................................................... 349/62

(58) Field of Classification Search
None
See application file for complete search history.

(56) References Cited

U.S. PATENT DOCUMENTS

| | | | | |
|---|---|---|---|---|
| 5,999,238 | A * | 12/1999 | Ihara | 349/58 |
| 6,880,953 | B2 * | 4/2005 | Shin | 362/225 |
| 2001/0050731 | A1 * | 12/2001 | An et al. | 349/58 |
| 2008/0170174 | A1 | 7/2008 | Nishiyama | |

FOREIGN PATENT DOCUMENTS

JP    2008-170739    7/2008

* cited by examiner

*Primary Examiner* — Lucy Chien
(74) *Attorney, Agent, or Firm* — Antonelli, Terry, Stout & Kraus, LLP.

(57) ABSTRACT

A liquid crystal display device includes: a resin frame including a storing space formed of a hole which passes through a first surface and a second surface; a light guide plate disposed in the storing space; and a liquid crystal display panel which is fixed on the first surface of the resin frame so as to overlap the light guide plate. The hole of the resin frame is formed of an inner peripheral surface, which is inclined, so that an opening of the second surface is smaller than an opening of the first surface. The light guide plate includes an outer peripheral surface, which is inclined, and is disposed in the storing space in a manner that the inner peripheral surface and the outer peripheral surface are opposed to each other.

5 Claims, 2 Drawing Sheets

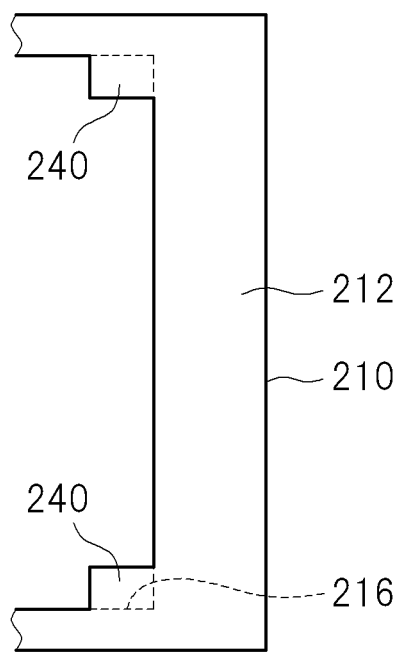
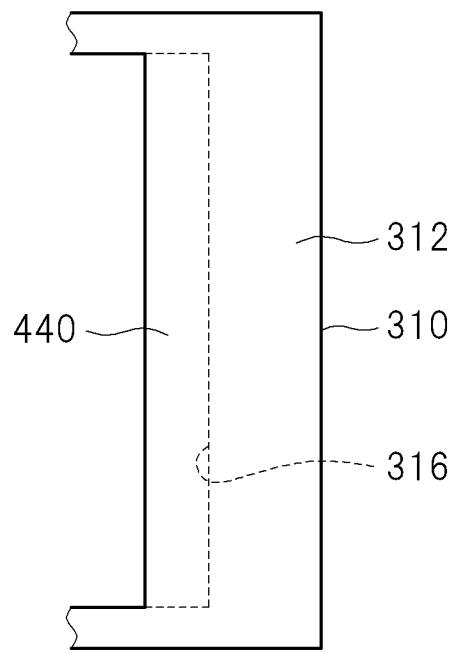
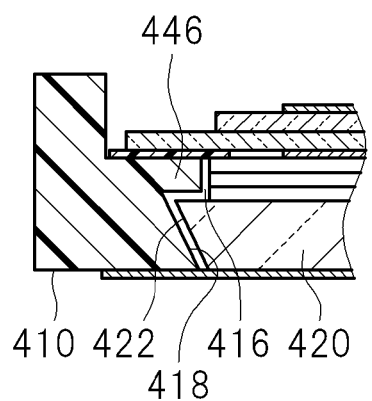

LIQUID CRYSTAL DISPLAY DEVICE

CROSS-REFERENCE TO RELATED APPLICATION

The present application claims priority from Japanese application JP 2010-072712 filed on Mar. 26, 2010, the content of which is hereby incorporated by reference into this application.

BACKGROUND OF THE INVENTION

1. Field of the Invention

The present invention relates to a liquid crystal display device.

2. Description of the Related Art

Liquid crystal display devices, such as one disclosed in Japanese Patent Application Laid-open No. 2008-170739, are used as display devices of a mobile phone, a digital still camera, a portable game device, and the like. Although those liquid crystal display devices have a tendency to be increased in screen size, the liquid crystal display device faces the demand not to increase its overall size. Therefore, a region (frame) around the display screen has come to be narrower. Accordingly, it is required to reduce a width of a resin frame which retains a liquid crystal display panel and a light guide plate.

Conventionally, a claw is formed on the light guide plate, and the claw is fitted into a recess portion of the resin frame, to thereby fix the light guide plate and the resin frame. However, in a narrow frame structure, it is difficult to form the recess portion in the resin frame. Therefore, another measure for retaining the light guide plate has become necessary.

SUMMARY OF THE INVENTION

It is an object of the present invention to provide a liquid crystal display device in which a resin frame is capable of retaining a light guide plate even when a screen size is increased and a frame is made narrow.

(1) According to the present invention, a liquid crystal display device includes: a resin frame including a storing space formed of a hole which passes through a first surface and a second surface; a light guide plate disposed in the storing space; and a liquid crystal display panel which is fixed on the first surface of the resin frame so as to overlap the light guide plate, in which: the hole of the resin frame is formed of an inner peripheral surface, which is inclined, so that an opening of the second surface is smaller than an opening of the first surface; and the light guide plate includes an outer peripheral surface, which is inclined, and is disposed in the storing space in a manner that the inner peripheral surface and the outer peripheral surface are opposed to each other. According to the present invention, by opposing the inclined inner peripheral surface and the inclined outer peripheral surface to each other, the light guide plate can be retained by the resin frame, and hence protrusions for fitting are unnecessary. Therefore, it is possible to adapt to an increase in screen size and narrowing of a frame.

(2) In the liquid crystal display device described in Item (1), in a triangle having an oblique line corresponding to a length of the inner peripheral surface between the first surface and the second surface, a height corresponding to a thickness of the resin frame between the first surface and the second surface, and a base corresponding to a length of protrusion of an end of the second surface with respect to an end of the first surface toward the hole, the following expression may be satisfied, $\tan \theta = (T/2C)$, where $\theta$ represents an angle formed by the second surface and the inner peripheral surface on an internal side of the resin frame, T represents a thickness of the light guide plate, and C represents a gap between the light guide plate and the inner peripheral surface.

(3) According to the present invention, a liquid crystal display device includes: a resin frame including a storing space formed of a hole which passes through a first surface and a second surface; a light guide plate disposed in the storing space; and a liquid crystal display panel which is fixed on the first surface of the resin frame so as to overlap the light guide plate, in which: the resin frame includes an overhanging portion formed on the first surface side of the resin frame, the overhanging portion protruding toward the hole, so that an opening of the first surface of the hole is smaller than an opening of the second surface of the hole; and the light guide plate includes an end portion located so as to be opposed to the overhanging portion. According to the present invention, the light guide plate can be retained by the resin frame by the overhanging portion, and hence it is possible to adapt to the increase in screen size and the narrowing of the frame.

(4) In the liquid crystal display device described in Item (3), the overhanging portion may be formed so that a tip end portion in a protruding direction is thicker in a direction of the second surface than a base portion, and the end portion of the light guide plate may be formed so that a part opposed to the base portion is thicker in a direction of the overhanging portion than apart opposed to the tip end portion.

(5) In the liquid crystal display device described in Item (4), the overhanging portion may include a surface facing the light guide plate, the surface including an inclined surface which is inclined in a direction of an inner peripheral surface of the hole, the end portion of the light guide plate may include a surface facing the overhanging portion, the surface including an inclined surface which is inclined in a center direction of the hole, the inclined surface of the overhanging portion and the inclined surface of the light guide plate may be opposed to each other, and the inclined surface of the overhanging portion may cover the inclined surface of the light guide plate on a center side of the light guide plate.

(6) In the liquid crystal display device described in any one of Items (3) to (5), the opening of the second surface of the hole may have a rectangular shape, and the overhanging portion may be formed only at a position opposed to a corner of the rectangular shape.

(7) In the liquid crystal display device described in any one of Items (3) to (5), the opening of the second surface of the hole may have a rectangular shape, and the overhanging portion may be formed only at a position opposed to a pair of opposite sides of the rectangular shape.

BRIEF DESCRIPTION OF THE DRAWINGS

In the accompanying drawings:

FIG. 4 is a view illustrating a part of a plan view of a first surface of a resin frame according to a first modified example of the second embodiment;

FIG. 5 is a view illustrating a part of a plan view of a first surface of a resin frame according to a second modified example of the second embodiment; and FIG. 6 is a view illustrating an example of a combination of the first embodiment and the second embodiment.

DETAILED DESCRIPTION OF THE INVENTION

Hereinafter, embodiments of the present invention are described with reference to the attached drawings.

[First Embodiment]

Figure 1:
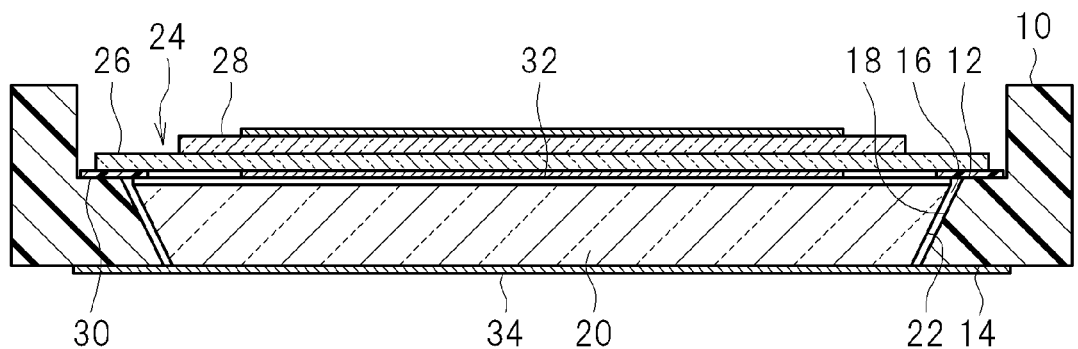
FIG. 1 is a cross-sectional view illustrating a liquid crystal display device according to a first embodiment of the present invention.
Figure 2:
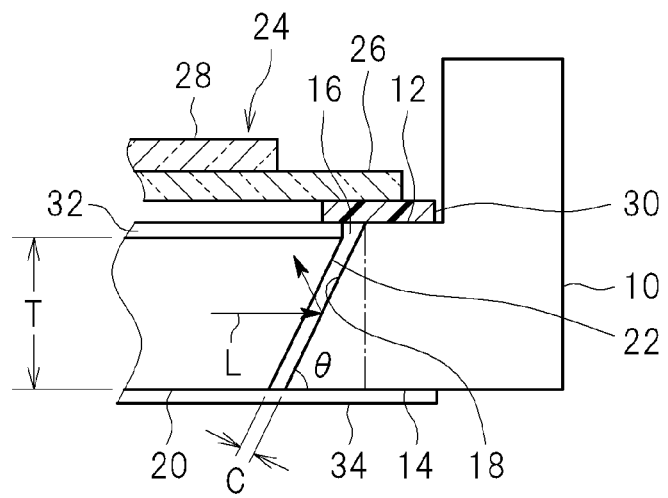
FIG. 2 is an enlarged view of a part of the liquid crystal display device illustrated in FIG. 1.

FIG. 1 is a cross-sectional view illustrating a liquid crystal display device according to a first embodiment of the present invention. FIG. 2 is an enlarged view of a part of the liquid crystal display device illustrated in FIG. 1.

The liquid crystal display device includes a resin frame 10. The resin frame 10 includes a first surface 12 and a second surface 14. A hole 16 is formed so as to pass through the first surface 12 and the second surface 14. The inner side of the hole 16 forms a storing space. The hole 16 of the resin frame 10 is formed so that an opening of the second surface 14 is smaller than an opening of the first surface 12. Therefore, the hole 16 is formed of an inclined inner peripheral surface 18. When an angle formed by the second surface 14 and the inner peripheral surface 18 on the internal side of the resin frame 10 is θ, θ<90° is satisfied (see FIG. 2).

The liquid crystal display device includes a light guide plate 20 which is disposed in the storing space formed of the hole 16 of the resin frame 10. The light guide plate 20 converts a point light source or a linear light source into a planar light source, and includes a planar light exiting surface and an opposite surface thereof. The light exiting surface and the opposite surface thereof are larger than an effective display region which displays an image. The light guide plate 20 includes an inclined outer peripheral surface 22. The inclined inner peripheral surface 18 of the resin frame 10 and the inclined outer peripheral surface 22 of the light guide plate 20 are opposed to each other.

According to this embodiment, by opposing the inclined inner peripheral surface 18 and the inclined outer peripheral surface 22 to each other, the light guide plate 20 may be retained by the resin frame 10, and hence protrusions for fitting are unnecessary. Therefore, it is possible to adapt to an increase in screen size and narrowing of the frame.

The liquid crystal display device includes a liquid crystal display panel 24. The liquid crystal display panel 24 includes a pair of substrates 26 and 28, and liquid crystal (not shown) sandwiched therebetween. One substrate 26 is formed larger than the other substrate 28. The liquid crystal display panel 24 is fixed on the first surface 12 of the resin frame 10 so as to overlap the light guide plate 20. Specifically, at the periphery of the hole 16, the substrate 26, which is the larger substrate of the liquid crystal display panel 24, is fixed on the first surface 12 by an adhesive material 30 such as a double-sided tape. The adhesive material 30 is a light shielding material.

An optical sheet 32 is disposed between the liquid crystal display panel 24 and the light guide plate 20. A reflective sheet 34 is disposed on the light guide plate 20 on a side opposite to the liquid crystal display panel 24. The reflective sheet 34 is adhered to the second surface 14 at the periphery of the hole 16 of the resin frame 10.

FIG. 2 is an enlarged view of a part of the liquid crystal display device illustrated in FIG. 1. In FIG. 2, in a triangle having an oblique line corresponding to a length of the inner peripheral surface 18 between the first surface 12 and the second surface 14, a height corresponding to a thickness of the resin frame 10 between the first surface 12 and the second surface 14, and a base corresponding to a length of protrusion of an end of the second surface 14 with respect to an end of the first surface 12 toward the hole 16, when the thickness of the light guide plate 20 is represented by T, and a gap between the light guide plate 20 and the inner peripheral surface 18 is represented by C, $$\tan \theta = (T/2C)$$

is satisfied.

As illustrated in FIG. 2, light L which has traveled through the light guide plate 20 exits from an end portion of the light guide plate 20, reflects off the inner peripheral surface 18 of the resin frame 10, and enters the light guide plate 20 again. The inner peripheral surface 18 of the resin frame 10 faces the opening of the hole 16 on the first surface 12 side. Therefore, the light reflected off the inner peripheral surface 18 travels toward the opening of the hole 16 on the first surface 12 side. That is, the inner peripheral surface 18 is inclined so that the light is reflected toward the direction of the liquid crystal display panel 24.

[Second Embodiment]

Figure 3:
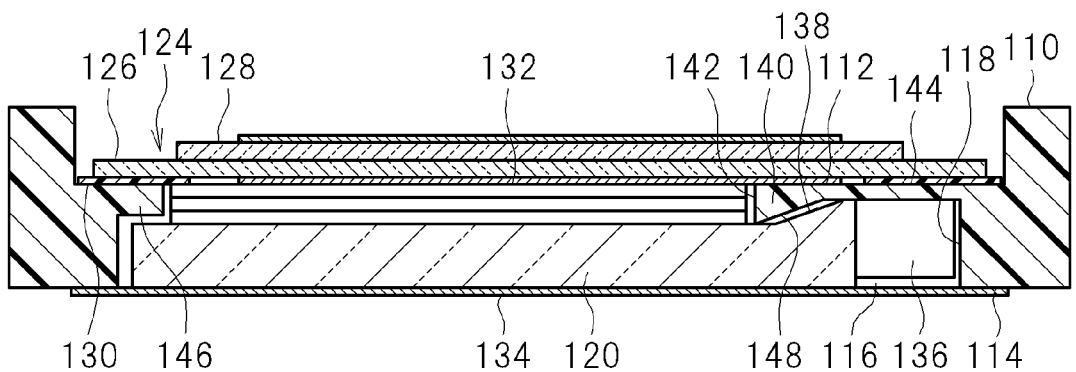
FIG. 3 is a cross-sectional view illustrating a liquid crystal display device according to a second embodiment of the present invention.

FIG. 3 is a cross-sectional view illustrating a liquid crystal display device according to a second embodiment of the present invention.

The liquid crystal display device includes a light source 136 such as a light emitting diode (LED). The light source 136 is a point light source or a linear light source, and hence in order to covert the point light source or the linear light source into a planar light source, a light guide plate 120 is disposed next to the light source 136. The light guide plate 120 includes an end surface through which light from the light source 136 enters the light guide plate 120, a planar light exiting surface, and an opposite surface thereof. The light exiting surface and the opposite surface thereof are larger than an effective display region which displays an image. The light guide plate 120 includes an inclined surface 138 in an upper surface (light exiting surface) at one end portion thereof. Specifically, the inclined surface 138, which is lowered toward a center direction from the end surface opposing the light source 136, is formed at one end portion of the light guide plate 120.

The liquid crystal display device includes a resin frame 110. The resin frame 110 includes a first surface 112 and a second surface 114. A hole 116 is formed so as to pass through the first surface 112 and the second surface 114. The inner side of the hole 116 forms a storing space. The hole 116 of the resin frame 110 is formed so that an opening of the first surface 112 is smaller than an opening of the second surface 114. The openings are different in size because a first overhanging portion 140 protruding toward the hole 116 is formed on the first surface 112 side of the resin frame 110. The first overhanging portion 140 is formed so that a tip end portion 142 in the protruding direction is thicker in the direction of the second surface 114 than a base portion 144. The first overhanging portion 140 includes, in a surface facing the direction of the second surface 114, an inclined surface 148 which is inclined in a direction of an inner peripheral surface 118 of the hole 116. Further, a second overhanging portion 146 is formed so as to be opposed to the first overhanging portion 140. The second overhanging portion 146 is also formed on the first surface 112 side of the resin frame 110 so as to protrude toward the hole 116, and hence this also makes the opening of the hole 116 in the first surface 112 smaller than the opening of the hole 116 in the second surface 114.

The light guide plate 120 and the light source 136 are disposed in the storing space formed of the hole 116 of the resin frame 110. The light guide plate 120 is disposed so that an end portion thereof is opposed to the first overhanging portion 140. The end portion of the light guide plate 120 is formed so that a part opposed to the base portion 144 of the resin frame 110 is thicker in the direction of the first overhanging portion 140 than a part opposed to the tip end portion 142 of the resin frame 110. The surface facing the first overhanging portion 140 at the end portion of the light guide plate 120 includes the inclined surface 138 which is inclined in the center direction of the hole 116. The inclined surface 138 of the light guide plate 120 and the inclined surface 148 of the first overhanging portion 140 are opposed to each other.

According to this embodiment, the light guide plate 120 can be retained by the resin frame 110 by the overhanging portions (at least sliding off to the directions of the first overhanging portion 140 and the second overhanging portion 146 can be prevented), and hence protrusions for fitting are unnecessary. Therefore, it is possible to adapt to the increase in screen size and the narrowing of the frame. Further, the inclined surface 148 of the first overhanging portion 140 covers the inclined surface 138 of the light guide plate 120 on the center side of the light guide plate 120, and hence it is possible to prevent light leakage.

The liquid crystal display device includes a liquid crystal display panel 124. The liquid crystal display panel 124 includes a pair of substrates 126 and 128, and liquid crystal (not shown) sandwiched therebetween. One substrate 126 is formed larger than the other substrate 128. The liquid crystal display panel 124 is fixed on the first surface 112 of the resin frame 110 so as to overlap the light guide plate 120. Specifically, at the periphery of the hole 116, the substrate 126, which is the larger substrate of the liquid crystal display panel 124, is fixed on the first surface 112 by an adhesive material 130 such as a double-sided tape. The adhesive material 130 is a light shielding material.

An optical sheet 132 is disposed between the liquid crystal display panel 124 and the light guide plate 120. A reflective sheet 134 is disposed on the light guide plate 120 on a side opposite to the liquid crystal display panel 124. The reflective sheet 134 is adhered to the second surface 114 at the periphery of the hole 116 of the resin frame 110.

FIG. 4 is a view illustrating a first modified example of the second embodiment. FIG. 4 illustrates a part of a plan view of a first surface 212 of a resin frame 210. A hole 216 formed in the resin frame 210 is formed so that an opening of a second surface has a rectangular shape. Further, on the first surface 212 side of the resin frame 210, overhanging portions 240 are formed only at positions opposed to corner portions of the rectangular shape which is the opening shape of the second surface.

FIG. 5 is a view illustrating a second modified example of the second embodiment. FIG. 5 illustrates a part of a plan view of a first surface 312 of a resin frame 310. A hole 316 formed in the resin frame 310 is formed so that an opening of a second surface has a rectangular shape. Further, on the first surface 312 side of the resin frame 310, overhanging portions 440 are formed only at positions opposed to a pair of opposite sides of the rectangular shape which is the opening shape of the second surface.

FIG. 6 is a view illustrating an example of a combination of the first embodiment and the second embodiment. In the example illustrated in FIG. 6, a light guide plate 420 includes an inclined outer peripheral surface 422, and a resin frame 410 includes an inclined inner peripheral surface 418. The outer peripheral surface 422 and the inner peripheral surface 418 are opposed to each other. Further, a second overhanging portion 446 is formed so as to protrude toward a hole 416 of the resin frame 410. In addition, the resin frame 410 includes the first overhanging portion 140 illustrated in FIG. 3. Other structures correspond to those described in the first and second embodiments.

The present invention is not limited to the embodiments described above, and various modifications may be made thereto. For example, the structures described in the embodiments may be replaced by a structure having substantially the same structure, a structure having the same action and effect, and a structure which may achieve the same object.

What is claimed is:

1. A liquid crystal display device, comprising:
a resin frame including a storing space formed of a hole which passes through a first surface and a second surface;
a light guide plate disposed in the storing space; and
a liquid crystal display panel which is fixed on the first surface of the resin frame so as to overlap the light guide plate, wherein:
the hole of the resin frame is formed of an inner peripheral surface, which is inclined, so that an opening of the second surface is smaller than an opening of the first surface; and
the light guide plate includes an outer peripheral surface, which is inclined, and is disposed in the storing space in a manner that the inner peripheral surface and the outer peripheral surface are opposed to each other;
wherein, in a triangle having an oblique line corresponding to a length of the inner peripheral surface between the first surface and the second surface, a height corresponding to a thickness of the resin frame between the first surface and the second surface, and a base corresponding to a length of protrusion of an end of the second surface with respect to an end of the first surface toward the hole, the following expression is satisfied, $$\tan \theta = (T/2C),$$

where $\theta$ represents an angle formed by the second surface and the inner peripheral surface on an internal side of the resin frame, T represents a thickness of the light guide plate, and C represents a gap between the light guide plate and the inner peripheral surface.

2. A liquid crystal display device, comprising:
a resin frame including a storing space formed of a hole which passes through a first surface and a second surface;
a light guide plate disposed in the storing space; and
a liquid crystal display panel which is fixed on the first surface of the resin frame so as to overlap the light guide plate, wherein:
the resin frame includes an overhanging portion formed on the first surface side of the resin frame, the overhanging portion protruding toward the hole, so that an opening of the first surface of the hole is smaller than an opening of the second surface of the hole; and
the light guide plate includes an end portion located so as to be opposed to the overhanging portion:
wherein:
the overhanging portion is formed so that a tip end portion in a protruding direction is thicker in a direction of the second surface than a base portion; and
the end portion of the light guide plate is formed so that a part opposed to the base portion is thicker in a direction of the overhanging portion than a part opposed to the tip end portion.

3. The liquid crystal display device according to claim 2, wherein:
- the overhanging portion includes a surface facing the light guide plate, the surface including an inclined surface which is inclined in a direction of an inner peripheral surface of the hole;
- the end portion of the light guide plate includes a surface facing the overhanging portion, the surface including an inclined surface which is inclined in a center direction of the hole;
- the inclined surface of the overhanging portion and the inclined surface of the light guide plate are opposed to each other; and
- the inclined surface of the overhanging portion covers the inclined surface of the light guide plate on a center side of the light guide plate.

4. The liquid crystal display device according to claim 2, wherein:
- the opening of the second surface of the hole has a rectangular shape; and
- the overhanging portion is formed only at a position opposed to a corner of the rectangular shape.

5. The liquid crystal display device according to claim 2, wherein:
- the opening of the second surface of the hole has a rectangular shape; and
- the overhanging portion is formed only at a position opposed to a pair of opposite sides of the rectangular shape.

* * * * *